(12) United States Patent
Averbeck et al.

(10) Patent No.: US 8,087,732 B2
(45) Date of Patent: Jan. 3, 2012

(54) METHOD AND APPARATUS FOR DETECTING A CIRCUIT FAILURE IN A VEHICLE BRAKE SYSTEM

(75) Inventors: Thorsten Averbeck, Schwarmstedt (DE); Jürgen Eickhoff, Walsrode (DE); Helmut Kortschakowski, Garbsen (DE)

(73) Assignee: WABCO GmbH, Hannover (DE)

( * ) Notice: Subject to any disclaimer, the term of this patent is extended or adjusted under 35 U.S.C. 154(b) by 427 days.

(21) Appl. No.: 12/454,601

(22) Filed: May 19, 2009

(65) Prior Publication Data

US 2009/0292415 A1  Nov. 26, 2009

(30) Foreign Application Priority Data

May 21, 2008 (DE) .......................... 10 2008 024 661

(51) Int. Cl.
    *B60T 8/88* (2006.01)
(52) U.S. Cl. ..................................... 303/122.09; 701/31
(58) Field of Classification Search .................. 303/122, 303/122.03, 122.09, 122.1, 122.13, 122.14; 701/29, 31

See application file for complete search history.

(56) References Cited

U.S. PATENT DOCUMENTS

| 2001/0054843 A1* | 12/2001 | Schmidt et al. .......... 303/122.13 |
| 2006/0043790 A1* | 3/2006 | Spieker ........................ 303/122 |
| 2008/0246335 A1* | 10/2008 | Spieker et al. .......... 303/122.08 |

* cited by examiner

*Primary Examiner* — Christopher Schwartz
(74) *Attorney, Agent, or Firm* — Kramer Levin Naftalis & Frankel LLP

(57) ABSTRACT

In a vehicle brake system including first and second brake circuits, a dual-circuit brake actuator, first and second control lines, the first brake circuit including a first brake pressure regulating valve and a first pressure sensor, the second brake circuit including a second brake pressure regulating valve and a second pressure sensor, the brake actuator connected to the first valve via the first control line to control that valve, and, via the second control line, to the second valve to control that valve, a control unit is communicatively connected to the pressure sensors and brake actuator and is adapted to effect a method for detecting a brake system circuit failure including determining a first pressure difference in the first brake circuit and a second pressure difference in the second brake circuit during actuation of the brake actuator, and determining a first comparison value from the first and second pressure differences.

24 Claims, 3 Drawing Sheets

METHOD AND APPARATUS FOR DETECTING A CIRCUIT FAILURE IN A VEHICLE BRAKE SYSTEM

FIELD OF THE INVENTION

The present invention generally relates to a method and apparatus for detecting a circuit failure in a vehicle brake system, in particular, a hydraulic brake system.

BACKGROUND OF THE INVENTION

Dual-circuit, hydraulic brake systems are known in which the brake system comprises a first brake circuit, a second brake circuit, a dual-circuit brake actuator, such as a master brake cylinder, a first control line and a second control line. In such conventional systems, the first brake circuit has a first valve for regulating the brake pressure in the first brake circuit, the second brake circuit has a second valve for regulating the brake pressure in the second brake circuit, and the brake actuator is connected via the first control line to the first valve in order to control the first valve, and via the second control line to the second valve in order to control the second valve. By actuating the brake actuator, for example by means of a brake pedal, which is operatively connected to the brake actuator, it is possible to regulate the brake pressure in the respective brake circuits by controlling the first and second valves, and, therefore, to regulate the braking force which acts on wheel brakes, which are connected to the respective brake circuits and can be controlled by means of a pressure medium.

A disadvantage of such conventional brake systems is that malfunctions or failures, in particular, in the sections comprising brake actuator—control lines—valves, are not detected.

SUMMARY OF THE INVENTION

The present invention overcomes disadvantages associated with conventional vehicle brake systems and provides embodiments of a method for detecting, and an apparatus for detecting, a brake system circuit failure, including malfunctions in the section comprising brake actuator—control lines—valves.

The brake system in accordance with embodiments of the present invention includes first and second brake circuits, a dual-circuit brake actuator, and first and second control lines. The first brake circuit has a first valve for regulating the brake pressure in the first brake circuit and a first pressure sensor for measuring the pressure in the first brake circuit. The second brake circuit has a second valve for regulating the brake pressure in the second brake circuit and a second pressure sensor for measuring the pressure in the second brake circuit. The brake actuator is connected via the first control line to the first valve, in order to control the first valve, and via the second control line to the second valve, in order to control the second valve.

A control unit is communicatively connected to the first and second pressure sensors and brake actuator. The control unit is adapted to (i) determine a first pressure difference in the first brake circuit from pressure values of the first pressure sensor, which are measured while the brake actuator is being actuated, (ii) determine a second pressure difference in the second brake circuit from pressure values of the second pressure sensor, which are measured while the brake actuator is being actuated, and (iii) calculate a first comparison value from the first and second pressure differences on the basis of a mathematical function.

The brake system preferably includes a warning device to warn the vehicle operator of a brake system malfunction. The warning device can be actuated by means of the control unit as a function of the first comparison value. The warning device can be designed, for example, to output acoustic, haptic and/or visual signals, e.g., as signal lamps, display elements in a display or a loudspeaker system.

The brake system is preferably a hydraulic brake system, but the present invention is not restricted to such a brake system.

The method for detecting a brake system circuit failure according to embodiments of the present invention includes the steps of: (a) while the brake actuator is being actuated, determining a first pressure difference in the first brake circuit, and a second pressure difference in the second brake circuit; and (b) determining a first comparison value from the first and second pressure differences. The first comparison value is preferably calculated from the percentage variation between the first pressure difference and the second pressure difference. The first comparison value can also be calculated from, for example, the difference between the first pressure difference and the second pressure difference. Other mathematical functions are also possible.

A significant variation between the first and second pressure differences, represented by the first comparison value, signals the presence of a malfunction. A malfunction can result, in particular, if the first or second valve has not been correctly actuated by the brake actuator, that is, there is a fault in the area comprising the brake actuator—control lines—valves. The fault is assumed to be located in the brake circuit in which the pressure difference is smaller than that in the other brake circuit. The faulty brake circuit can be detected by sign-dependent determination of the comparison value, which is preferred according to the present invention.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
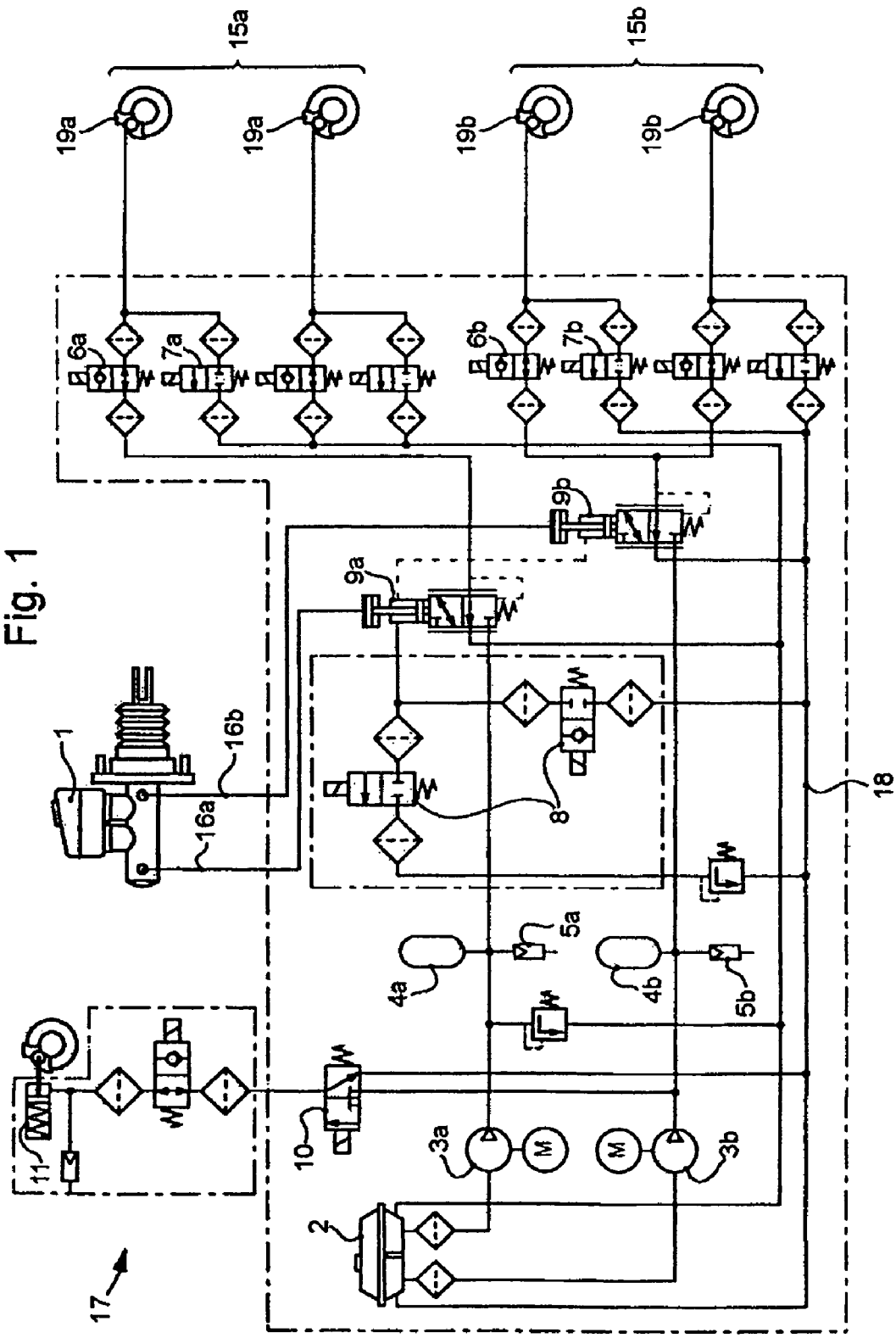
FIG. 1 is a schematic diagram depicting a hydraulic brake system in accordance with an embodiment of the present invention.
Figure 2:
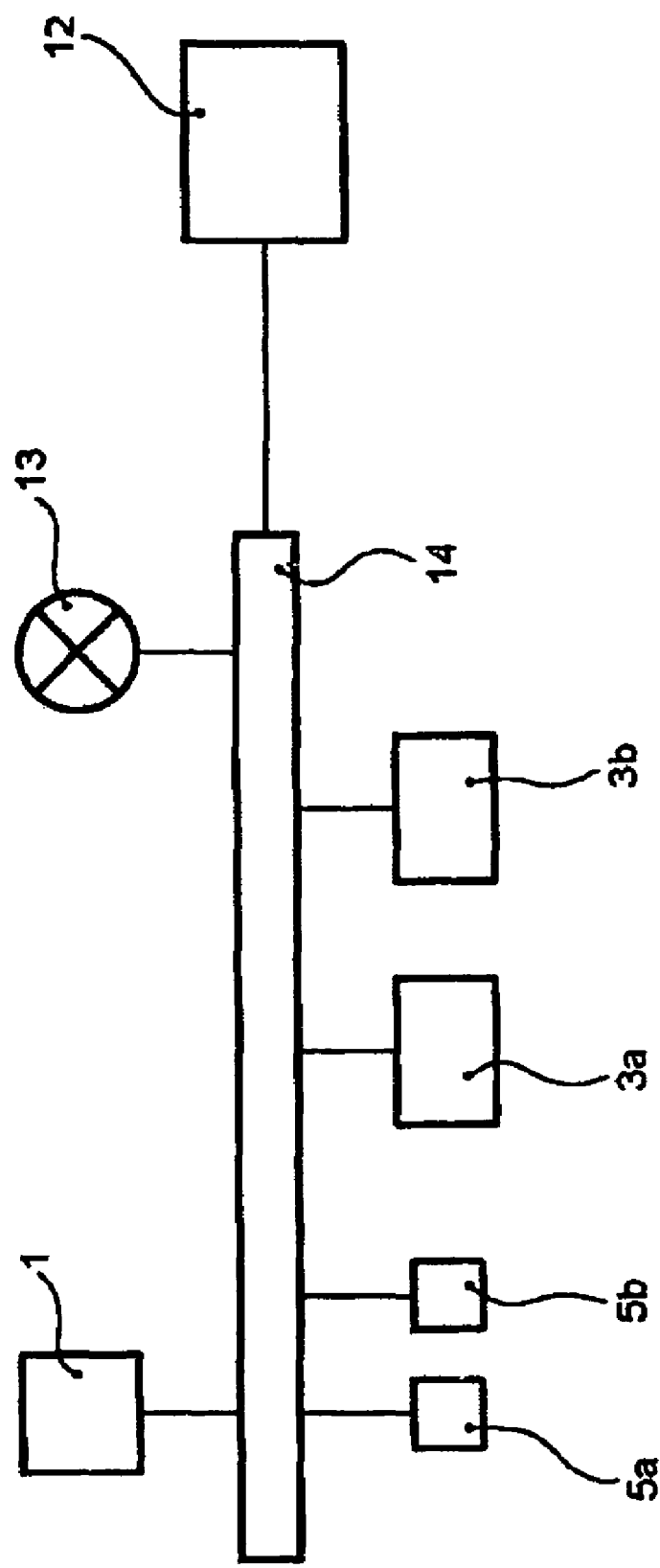
FIG. 2 is a diagram illustrating the communicative connection between certain components of the brake system in accordance with an embodiment of the present invention.

Referring to the drawings, FIGS. 1 and 2 show a hydraulic brake system constructed and arranged to detect a brake system circuit failure in accordance with embodiments of the present invention. The brake system includes a first brake circuit 15a, a second brake circuit 15b, a dual-circuit brake actuator 1, here, a tandem master brake cylinder, a first control line 16a and a second control line 16b. First brake circuit 15a has a first valve 9a for regulating the brake pressure in the first brake circuit, a first pressure sensor 5a for measuring the pressure in the first brake circuit, a braking medium reservoir vessel 4a, a pump 3a, wheel brakes 19a, which can be regulated by means of the brake pressure, and inlet and outlet valves 6a and 7a. First brake circuit 15a is connected to a braking medium vessel 2.

In order to increase the pressure in first brake circuit 15a, pump 3a, which feeds braking medium from braking medium vessel 2 to brake circuit 15a, is actuated. A braking medium supply is built up in braking medium reservoir vessel 4a. The pressure is measured by pressure sensor 5a. Valve 9a, here, a relay valve, is switched by actuating master brake cylinder 1, for example by depressing a brake pedal, as a result of which the brake pressure at wheel brakes 15a is increased by opening inlet valves 6a. The inlet valves are open in the state of rest and can be closed when necessary, for example in order to prevent a further rise in pressure in the wheel brakes. Storing pressure medium in reservoir vessel 4a ensures that the available brake pressure is sufficiently high and, at the same time, a sufficient braking medium volume is available.

By activating outlet valves 7a it is possible to reduce the brake pressure acting on wheel brakes 19a. The pressure medium is fed back to reservoir 2 via a return line 18 in this case.

Second brake circuit 15b corresponds to first brake circuit 15a in that it also has a pump 3b, a reservoir vessel 4b, a pressure sensor 5b, a relay valve 9b, inlet valves 6b, outlet valves 7b and wheel brakes 19b. Also, in common with first brake circuit 15a, second brake circuit 15b is connected to reservoir 2.

Furthermore, the brake circuit has a parking brake 17, including, in particular, a brake cylinder 11 via which the parking brake can be controlled, and a parking brake valve 10. Parking brake cylinder 11 can be connected to second brake circuit 15b, as well as to return line 18 to reservoir 2, via brake valve 10.

In addition, the brake system is equipped with an electronic control unit 12 (shown in FIG. 2). Control unit 12 is in electrical communication, via electrical lines 14, with master brake cylinder 1, pressure sensors 5a, 5b, pumps 3a, 3b and a warning device 13. In the exemplary embodiment depicted in FIG. 2, control unit 12 is mounted directly on a hydraulic unit which includes pressure sensors 5a, 5b and pumps 3a, 3b. Alternatively, a CAN data bus can be used. Warning device 13 includes a display for displaying fault warnings. Warning device 13 can be actuated by means of control unit 12.

A method for detecting a brake system circuit failure according to embodiments of the present invention includes: (a) determining a first pressure difference in the first brake circuit, and a second pressure difference in the second brake circuit, and (b) determining a first comparison value from the first and second pressure differences. In step (a), in order to determine the first and second pressure differences, a first initial pressure value is preferably measured in the first brake circuit and a second initial pressure value is measured in the second brake circuit during the transition from the non-actuated state of the brake actuator to the actuated state. The first pressure difference is calculated from the difference between the first initial pressure value and a first pressure value in the first brake circuit, which is measured while the brake actuator is being actuated. The second pressure difference is calculated from the difference between the second initial pressure value and a second pressure value in the second brake circuit, which is measured while the brake actuator is being actuated, preferably with the correct sign. It is particularly advantageous to determine a plurality of pressure values in the first and/or second brake circuits within a defined, first time period, and to define the pressure value with the maximum variation from the first initial pressure value as the first pressure value, and to define the pressure value with the maximum variation from the second initial pressure value as the second pressure value. This makes it possible to reduce the risk that, when fluctuations occur in the pressure values, the pressure values, which are adopted for the calculation of the pressure differences, are ones that vary to an unusually small degree from the initial pressure values compared to other pressure values within the time period. This would make detection of a malfunction more difficult or even prevent it.

Preferably, one or more pressure values are determined in the first and second brake circuits, respectively, within a defined, second time period which starts with the transition of the brake actuator from the non-actuated state to the actuated state, and the process is terminated if the maximum difference between the pressure values of the first brake circuit with the first initial pressure value and the maximum difference between the pressure values of the second brake circuit with the second initial pressure value are outside a predefined range. This allows, in particular, for the case in which the brake actuator is only weakly actuated and the pressure differences which are generated do not permit sufficiently clear detection of faults. It is preferred that the second time period be shorter than the first time period.

The range can also be determined by threshold values, for example in such a form that a maximum difference between the pressure values is, in each case, smaller than a predefined threshold value. A plurality of ranges can also be provided separately for the respective brake circuit.

In a step (c), at the transition from the actuated state to the non-actuated state of the brake actuator, a first final pressure difference is preferably calculated from the difference between the first initial pressure value and the instantaneous pressure value in the first brake circuit, a second final pressure difference is calculated from the difference between the second initial pressure value and the instantaneous pressure value in the second brake circuit, and a second comparison value is calculated from the first final pressure difference and the second final pressure difference. The second comparison value is preferably calculated according to the same mathematical function as the first comparison value—the calculation possibilities apply correspondingly.

In a step (d1) a warning device of the brake system is preferably actuated if the first comparison value is outside a predefined, first value range.

The first value range includes comparison values that identify fault-free operation of the brake system, that is, "normal" comparison values. Values outside the value range indicate that the brake system is malfunctioning.

It is possible to provide a plurality of value ranges. In particular, the value range can also be determined by means of a threshold value which identifies the limit of the value range.

Alternatively or additionally, in a step (d2) a warning device of the brake system is preferably actuated if the first comparison value is outside a predefined, first value range and if the second comparison value is outside a predefined, second value range.

The second value range also includes normal comparison values that identify fault-free operation of the brake system. Checks as to whether the second comparison value is outside the second value range increase the probability of a deviation—detected by the method—from the normal behavior of the brake system actually being due to a functional fault.

Alternatively or additionally, in a step (d3) a fault counter is incremented by a predefined, first value if the first comparison value is outside a predefined, first value range.

The introduction of a fault counter makes it possible to increase the accuracy that an abnormal variation detected by the inventive method is actually due to a functional fault of the brake system. For example, measures such as the actuation of a warning device therefore cannot be taken until the fault counter is outside a predefined, third value range. The limits of this third value range can, in particular, be set such that detection is required of not only one but a plurality of instances of abnormal variations of the pressure differences in direct succession for the fault counter to lie outside the third value range.

Preferably, the fault counter be incremented by a defined, first value. Alternatively, another mathematical function for changing the original value of the fault counter can also be selected.

In an alternative step (d3), the fault counter is incremented by a predefined, fixed value if the first comparison value is outside a predefined, first value range and if the second comparison value is outside a predefined, second value range.

It is preferred that the fault counter be incremented only if the brake pressure has not been influenced by other factors such as, for example, by actuation of a pump inside the brake system, by valve actuation processes at inlet and outlet valves of the brake system, or by the application of a parking brake.

In a step (d4), the fault counter is preferably decremented by a predefined, second value if the first comparison value is not outside a predefined, first value range and/or, under certain circumstances, if the second comparison value is not outside a predefined, second value range. In this way, it is possible to take into account that a detected abnormal variation of the pressure differences is not inevitably due to a malfunction of the brake system and that a malfunction of the brake system might only sometimes be detected. The relationship between the first and second values reflects the sensitivity of the inventive method. It should be understood that, instead of incrementing the fault counter at a first value and decrementing the fault counter at a second value, it is also possible to use other algorithms. Furthermore, step (d4) is preferably carried out only if the brake pressure has not been influenced by other factors such as, for example, the activities noted in the preceding paragraph.

The brake system preferably has means for raising the brake pressure in the first and second brake circuits. In a step (e), when the fault counter is outside a predefined, third value range, the pressure sensor in the brake circuit having the smaller (as measured in step (a)) pressure difference is checked to determine if it is operating without fault, and if it is, a warning device is actuated in a step (f). This pressure sensor check is carried out in the possibly malfunctioning brake circuit preferably by increasing the pressure in lo this brake circuit, for example by activating a pump located in this brake circuit, and registering whether or not the pressure sensor detects an increase in pressure.

The fault counter is preferably set to an initial value if the ignition system of the vehicle is switched off, another fault has already been detected within the brake system, and/or the brake system or parts thereof are in diagnostic operating mode.

Figure 3:
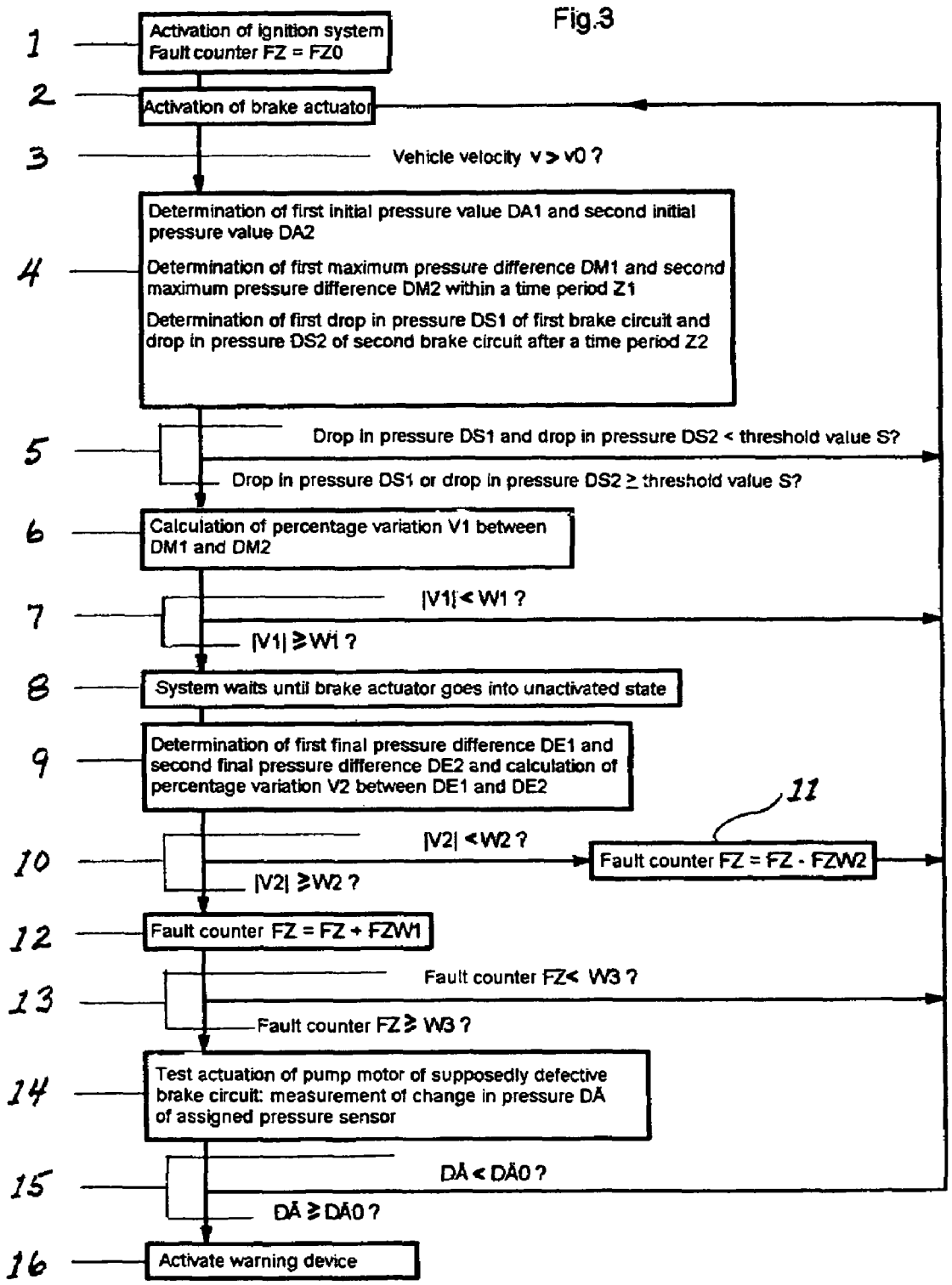
FIG. 3 is a flowchart depicting process steps for detecting a brake system circuit failure according to an embodiment of the present invention.

Turning back to the drawings, FIG. 3 is a flowchart depicting process steps in accordance with an embodiment of the present invention for detecting a circuit failure in the brake system, in particular, in the area comprising master brake cylinder 1—control lines 16a, 16b—relay valves 9a, 9b.

In step 1, a fault counter FZ is set to the value FZ0 when the ignition system of the vehicle is actuated. The fault counter FZ is likewise loaded with the value 0 if control unit 12 is in diagnostic operating mode and/or another fault has already been detected within the brake system.

A check is then performed to ascertain whether the brake actuator, here master brake cylinder 1, has been actuated (step 2).

If the vehicle velocity v is greater than a threshold value v0 (decision 3), here 8 kilometers an hour, for example, the sequence for fault detection is started.

At step 4, during the transition from the non-actuated state of brake cylinder 1 to the actuated state, a first initial pressure value DA1 in first brake circuit 15a and a second initial pressure value DA2 in second brake circuit 15b are measured by means of first pressure sensor 5a or second pressure sensor 5b, respectively, and the values are stored by control unit 12. Within a defined, first time period Z1, here, for example, the following two seconds, pressure values are determined in first and second brake circuits 15a, 15b cyclically every 5 milliseconds, for example, and the difference from pressure values DA1 and DA2, respectively, is determined. The maximum pressure difference DM1 in first brake circuit 15a and the maximum pressure difference DM2 in second brake circuit 15b during the time period Z1 is stored by control unit 12, taking into account the correct sign. Furthermore, within a time period Z2 which follows the actuation of brake actuator 1, and which is one second here, for example, the maximum difference DS1 between the pressure values of first brake circuit 15a and the maximum difference DS2 between the pressure values of second brake circuit 15b which represent the drop in pressure in the brake circuits is determined in first and second brake circuits 15a, 15b from the measured pressure values by calculating the difference with the initial pressure values DA1 and DA2, respectively.

If the drop in pressure DS1, DS2 in the two brake circuits 15a, 15b is, respectively, smaller than a threshold value S (decision 5), for example 5 bar, the process is ended (e.g., reverts to step 2). If the drop in pressure DS1 and DS2 in one of the brake circuits is greater than threshold value S (decision 5), the percentage variation V1 of first maximum pressure difference DM1 and second maximum pressure difference DM2 is calculated (step 6).

If the absolute value of the percentage variation V1 is smaller than a threshold value W1 (decision 7), i.e., in this exemplary embodiment, if the maximum pressure difference DM1, DM2 with the relatively small value is not lower than 20% of the maximum pressure difference DM1, DM2 with the relatively large value, the process is ended. If the absolute value of the percentage variation V1 is less than or equal to W1 (decision 7), i.e., in this embodiment, if the maximum pressure difference DM1, DM2 with the relatively small value is lower than 20% of the maximum pressure difference DM1, DM2 with the relatively large value, the system waits until the brake actuator 1 changes from the actuated state into the non-actuated state (step 8).

At the transition from the actuated state into the non-actuated state of brake actuator 1, a first final pressure difference DE1 is calculated from the difference between first initial pressure value DA1 and the instantaneous pressure value in first brake circuit 15a, a second final pressure difference DE2 is calculated from the difference between second initial pressure value DA2 and the instantaneous pressure value in second brake circuit 15b, and a second comparison value V2 is calculated by calculating the percentage variation between first final pressure difference DE1 and second final pressure difference DE2 (step 9).

If the absolute value of the percentage variation V2 is smaller than a threshold value V2 (decision 10), i.e., in this embodiment, if the final pressure difference DE1, DE2 with the relatively small value is not lower than 20% of the final pressure difference DE1, DE2 with the relatively large value, fault counter FZ is reduced by a value FZW2 (step 11), which is equal to 1 here, and the process is ended. If the absolute value of the percentage variation V2 is equal to or greater than W2 (decision 10), i.e., in this embodiment, the final pressure difference DE1, DE2 with the relatively small value is lower than 20% of the final pressure difference DE1, DE2 with the relatively large value, fault counter FZ is incremented by a first value FZW1 (step 12)—in this case, FZW1 has the value "10".

Fault counter FZ is, however, decremented only if the pumps 3a, 3b have not been actuated, the inlet or outlet valves 6a, 6b and 7a, 7b, respectively, of wheel brakes 19a, 19b have not been actuated or no other factors which have influenced the brake pressure within brake circuits 15a, 15b, for example actuation of parking brake 17, have been effected in the time period beginning with the determination of the initial pressure values DA1, DA2 up to the specification of the pressure values for the determination of first and second final pressure difference DE1, DE2. Fault counter FZ is likewise not incremented by the value FZW1 if such conditions have been met.

If the value of fault counter FZ is lower than a threshold value W3 (decision 13), here, for example, ≧20, the process is ended. If the value of fault counter FZ is greater than or equal to W3 (decision 13), a test actuation of the pump motor is effected by the supposedly defective brake circuit with a chronologically limited period (step 14), e.g., two seconds. The supposedly defective brake circuit can be identified by the signs of correct calculations of the maximum pressure differences DM1, DM2.

If the storage pressure DÄ in this brake circuit has increased owing to actuation of the pump by a certain absolute value DÄO (decision 15), here, for example, 3 bar, this is a reliable indication that the pressure sensor of this brake circuit is intact and the maximum pressure difference which is measured by this pressure sensor and is significantly lower than the maximum pressure difference of the other brake circuit has been caused by a circuit failure, in particular in the section including brake actuator 1—control lines 16a, 16b—relay valves 9a, 9b. In such case, a fault is stored for this brake circuit and the warning device 13 is actuated (step 16).

Control unit 12 assumes the evaluation of the pressure values which are measured by pressure sensors 5a, 5b, the formation of the pressure differences, the storage of the values, the resetting, the incrementing and decrementing of the fault counter, the comparison of the pressure differences and of the fault counter value with the threshold values, the execution of the test actuation and the actuation of the warning device. Control unit 12 leverages embodied components or program codes and is suitably configured to effect the method steps according to embodiments of the present invention. The brake system is therefore equipped to detect a circuit failure autonomously.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for detecting a circuit failure in a brake system of a vehicle, the brake system including first and second brake circuits, a dual-circuit brake actuator, and first and second control lines, the first brake circuit including a first valve for regulating brake pressure in the first brake circuit and a first pressure sensor for measuring pressure in the first brake circuit, the second brake circuit including a second valve for regulating brake pressure in the second brake circuit and a second pressure sensor for measuring pressure in the second brake circuit, the brake actuator being connected via the first control line to the first valve to control the first valve, and via the second control line to the second valve to control the second valve, the method comprising the steps of: (i) during actuation of said brake actuator, (a) determining a first pressure difference in said first brake circuit and (b) determining a second pressure difference in said second brake circuit, and (ii) determining a first comparison value from said first and second pressure differences.

2. The method as claimed in claim 1, wherein said first comparison value is calculated from one of (i) the percentage variation between said first pressure difference and said second pressure difference, and (ii) the difference between said first pressure difference and said second pressure difference.

3. The method as claimed in claim 1, wherein said steps of determining said first and said second pressure differences include (i) during the transition from a non-actuated state of said brake actuator into an actuated state, measuring a first initial pressure value in said first brake circuit and a second initial pressure value in said second brake circuit, and (ii) (a) calculating said first pressure difference from the difference between (1) said first initial pressure value and (2) a first pressure value in said first brake circuit subsequently measured during actuation of said brake actuator, and (b) calculating said second pressure difference from the difference between (3) said second initial pressure value and (4) a second pressure value in said second brake circuit subsequently measured during actuation of said brake actuator.

4. The method as claimed in claim 3, wherein a plurality of pressure values are determined in at least one of said first and second brake circuits within a predefined first time period, and the pressure value of said plurality of pressure values which varies the most from said first initial pressure value is set as said first pressure value, and the pressure value of said plurality of pressure values which varies the most from said second initial pressure value is set as said second pressure value.

5. The method as claimed in claim 3, wherein at least one pressure value is determined in each of said first and second brake circuits within a predefined second time period commencing with the transition of said brake actuator from said non-actuated state into said actuated state, and said method is terminated when a first maximum difference between said at least one pressure value of said first brake circuit and said first initial pressure value and a second maximum difference between said at least one pressure value of said second brake circuit and said second initial pressure value are outside a predefined range.

6. The method as claimed in claim 3, further comprising the steps of: at the transition from said actuated state of said brake actuator into said non-actuated state, calculating a first final pressure difference from the difference between said first initial pressure value and a first instantaneous pressure value in said first brake circuit, calculating a second final pressure difference from the difference between said second initial pressure value and a second instantaneous pressure value in said second brake circuit, and calculating a second comparison value from said first final pressure difference and said second final pressure difference.

7. The method as claimed in claim 6, wherein said second comparison value is calculated from one of (i) the percentage variation between said first final pressure difference and said second final pressure difference, and (ii) the difference between said first final pressure difference and said second final pressure difference.

8. The method as claimed in claim 6, further comprising the step of actuating a warning device of said brake system when said first comparison value is outside a predefined first value range and said second comparison value is outside a predefined second value range.

9. The method as claimed in claim 6, further comprising the step of incrementing a fault counter by a predefined first value when said first comparison value is outside a predefined first value range and said second comparison value is outside a predefined second value range.

10. The method as claimed in claim 6, further comprising the step of incrementing a fault counter by a predefined first value when said first comparison value is outside a predefined first value range and when said second comparison value is outside a predefined second value range, and when, in a time period during measurement of said first initial pressure value, said first pressure value, said second initial pressure value, and said second pressure value, brake pressure is not influenced by other vehicle activity.

11. The method as claimed in claim 10, wherein said other vehicle activity includes at least one of (i) actuation of a pump inside said brake system, (ii) valve actuation processes at inlet and outlet valves of said brake system, and (iii) application of a parking brake.

12. The method as claimed in claim 6, further comprising the step of decrementing a fault counter by a predefined second value when at least one of (i) said first comparison value is within a predefined first value range and (ii) said second comparison value is within a predefined second value range.

13. The method as claimed in claim 12, wherein said predefined second value is less than a predefined first value.

14. The method as claimed in claim 12, further comprising the step of actuating a warning device of said brake system when said fault counter is outside a predefined third value range.

15. The method as claimed in claim 3, further comprising the step of incrementing a fault counter by a predefined first value when said first comparison value is outside a predefined first value range, and when, in a time period during measurement of said first initial pressure value, said first pressure value, said second initial pressure value, and said second pressure value, brake pressure is not influenced by other vehicle activity.

16. The method as claimed in claim 15, wherein said other vehicle activity includes at least one of (i) actuation of a pump inside said brake system, (ii) valve actuation processes at inlet and outlet valves of said brake system, and (iii) application of a parking brake.

17. The method as claimed in claim 1, further comprising the step of actuating a warning device of said brake system when said first comparison value is outside a predefined first value range.

18. The method as claimed in claim 1, further comprising the step of incrementing a fault counter by a predefined first value when said first comparison value is outside a predefined first value range.

19. The method as claimed in claim 18, further comprising the step of actuating a warning device of said brake system when said fault counter is outside a predefined third value range.

20. The method as claimed in claim 18, wherein said brake system includes means for raising brake pressure in said first and second brake circuits, and further comprising the steps of, when said fault counter is outside a predefined third value range, ascertaining whether the one of said first and second pressures sensor in the one of said first and second brake circuits having the smaller one of said first and second pressure differences is operating without fault, and, if so, actuating a warning device.

21. The method as claimed in claim 18, wherein said fault counter is set to an initial value when at least one of (i) an ignition system of said vehicle is switched off, (ii) a fault has already been detected within said brake system and (iii) at least a part of said brake system is in diagnostic operating mode.

22. An apparatus for detecting a circuit failure in a vehicle brake system, comprising first and second brake circuits, a dual-circuit brake actuator, first and second control lines, and a control unit, said first brake circuit including a first valve for regulating brake pressure in said first brake circuit and a first pressure sensor for measuring pressure in said first brake circuit, said second brake circuit including a second valve for regulating brake pressure in said second brake circuit and a second pressure sensor for measuring pressure in said second brake circuit, said brake actuator being connected via said first control line to said first valve to control said first valve, and via said second control line to said second valve to control said second valve, said control unit being communicatively connected to said first and second pressure sensors and said brake actuator, said control unit being adapted to (i) determine a first pressure difference in said first brake circuit from pressure values of said first pressure sensor measured during actuation of said brake actuator, (ii) determine a second pressure difference in said second brake circuit from pressure values of said second pressure sensor measured during actuation of said brake actuator, and (iii) calculate a first comparison value from said first and second pressure differences based on a mathematical function.

23. The apparatus as claimed in claim 22, further comprising a warning device actuatable by said control unit as a function of said first comparison value.

24. The apparatus as claimed in claim 22, wherein said brake system is a hydraulic brake system.

\* \* \* \* \*